United States Patent [19]

Miller et al.

[11] 4,217,687

[45] Aug. 19, 1980

[54] METHOD AND APPARATUS FOR MAKING BACKOUT STOP FOR CAULKER CARTRIDGE

[75] Inventors: Phillip L. Miller, Dundee; Dick T. vanManen, Canandaigua, both of N.Y.

[73] Assignee: Voplex Corporation, Fairport, N.Y.

[21] Appl. No.: 9,114

[22] Filed: Feb. 5, 1979

[51] Int. Cl.$^2$ ............................................. B23P 25/00
[52] U.S. Cl. ................................ 29/527.2; 29/527.1; 29/33 T; 264/293; 264/310
[58] Field of Search ..................... 29/527.2, 423, 424, 29/33 T, 33.15, 527.1; 269/7; 264/293, 310

[56] References Cited

U.S. PATENT DOCUMENTS

| | | | |
|---|---|---|---|
| 2,310,158 | 2/1943 | Austin | 29/527.2 X |
| 2,803,176 | 8/1957 | Gazette | 29/33.15 |
| 3,090,996 | 5/1963 | Reichenbach et al. | 29/527.1 |
| 3,103,140 | 9/1963 | Connelly | 29/33.15 X |
| 3,354,529 | 11/1967 | James | 29/527.1 |
| 3,962,776 | 6/1976 | Mikami | 29/527.2 |
| 3,987,523 | 10/1976 | Nelson et al. | 29/33 T |

Primary Examiner—Ervin M. Combs
Assistant Examiner—V. K. Rising

Attorney, Agent, or Firm—Stonebraker, Shepard & Stephens

[57] ABSTRACT

The inventive method and apparatus make a backout stop for a caulker cartridge having a cylindrical barrel of resin material. The backout stop is formed at the rear end of the barrel as an inwardly oriented hook that has a generally triangular cross-sectional shape. The two exposed sides of the hook are an inclined surface sloping radially inward so a plunger can slide over the backout stop into the rear of the barrel and an abrupt edge extending radially inward to prevent the plunger from backing out of the barrel. The apparatus includes a tool with a socket that fits over the rear end of the barrel and has a resin-forming edge protruding obliquely into the socket to extend along the inclined surface of the hook when the tool is seated on the rear end of the barrel. The barrel and tool are supported on a common axis, are moved into axial engagement, and are rotated relative to each other while pressed together so that the edge plows along the inclined surface and forms the resin material into the hook. The tool can use several edges and preferably rotates through a short enough arc to form the stop as several separated segments around the rear end of the barrel.

11 Claims, 8 Drawing Figures

METHOD AND APPARATUS FOR MAKING BACKOUT STOP FOR CAULKER CARTRIDGE

BACKGROUND OF THE INVENTION

Resin caulking cartridges, because of their superior ability to contain and preserve certain caulking materials, are supplanting paper caulkers. Resin caulker cartridges are also being used for a wider range of caulking compounds, and this has led to a problem that is solved by the invention.

Some caulking materials have a relatively large coefficient of thermal expansion and can also give off gas during storage. This requires expansion room, and because of the limitations from other parameters, these materials tend to force the caulker plunger rearwardly out of the rear end of the caulker during storage at high temperatures. This liberates the caulker contents and creates a messy loss.

A partial solution to this problem is making the caulker barrels relatively thin-walled so that the barrel can bulge some as the contents expand. The pressure available to bulge the barrel wall is limited to the pressure the plunger can contain, however, so that this solution offers less than adequate security against plunger backout.

The inventive solution is a plunger backout stop formed in the right shape at the rear end of the cartridge barrel by a particular method and apparatus that makes the stop practical, reliable, and economical for mass-produced caulkers. The shape of the stop allows easy insertion of the plunger into the barrel and reliably prevents plunger backout. The apparatus is economical, the process is speedy, and the desired shape is acheived at very low cost.

SUMMARY OF THE INVENTION

The inventive method and apparatus makes a backout stop for a caulker cartridge having a cylindrical barrel of resin material. The backout stop is formed at the rear end of the barrel as a radially inwardly oriented hook that is generally triangular in cross-section with an inclined surface sloping radially inward from the region of the outer surface of the barrel for allowing a plunger to be moved over the backout stop into the rear end of the barrel. The hook also has an abrupt edge extending inward from the inside surface of the barrel and preventing the plunger from moving rearwardly out of the rear end of the barrel. A tool has a socket shaped to fit over the rear end of the barrel, and a resin-forming edge protrudes obliquely into the socket so that when the tool and the rear end of the barrel are in seated engagement the edge extends along the inclined surface of the backout hook. The barrel and the tool are supported on a common axis with the tool socket confronting the rear end of the barrel, and one or the other of the barrel and the tool are moved axially to press the tool and the rear end of the barrel together in seated engagement so that the edge is pressed into the resin material at the rear end of the barrel. Then one or the other of the barrel and the tool are rotated while the tool and the barrel are pressed together so that the edge plows along the inclined surface and forms the resin material at the rear end of the barrel into the triangular shape of the backout hook. The tool and the barrel are then axially separated, and the entire operation occurs very quickly at room temperature. The tool preferably has several resin-forming edges and is rotated through a short enough arc so that the backout stop is formed as several spaced segments around the rear end of the barrel.

DRAWINGS

DETAILED DESCRIPTION

Figure 1:
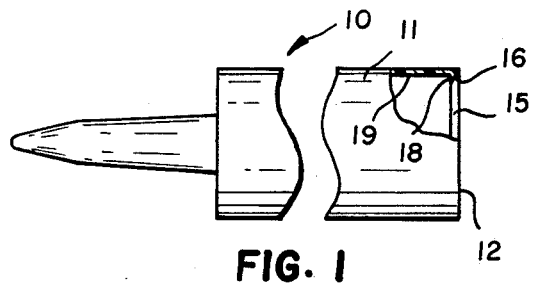
FIG. 1 is a partially cut-away, side elevational view of a caulker cartridge having a backout stop formed according to the invention.

The invention applies to caulker cartridges 10 having cylindrical barrels 11 formed of resin material, and it produces a backout stop 15 formed at the rear end 12 of barrel 11 to prevent a plunger (not shown) from backing out of cartridge 10 under pressure from the cartridge contents. Backout stop 15 is generally triangular in cross-section and has an inclined surface 16 that slopes radially inward from the region of the outer surface 17 of the cylindrical wall of barrel 11 providing an inclined entry ramp that allows a plunger to slide freely over backout stop 15 and into the rear end of barrel 11 after it is filled. Backout hook 15 also has an abrupt edge 18 that extends radially inward from the inside surface 19 of barrel 11 and prevents a plunger from moving rearwardly out of the rear end 12 of the caulker. Backout stop 15 can extend for a full 360 degrees around rear end 12, but is preferably formed as several segments equally spaced around rear end 12 as explained more fully below.

The triangular hook shape of backout stop 15 allows easy insertion of a plunger and provides a sufficiently abrupt edge 18 so that a plunger inserted into barrel 11 beyond stop 15 is trapped behind edge 18 and prevented from backing out the rear end 12. Forming backout stop 15 as several equally spaced segments around rear end 12 facilitates the insertion of a plunger by allowing a slight deformation of barrel 11 from the cylindrical as the plunger forces the stop segments radially outward during its insertion into the caulker over the inclined edge 16. Several spaced stop segments are as reliable as a full 360 degree stop in preventing plunger backout, and separate segments can be made easily with only a few degrees of rotation, as explained below.

Backout stop 15 is formed by a tool 20 that is pressed against rear end 12 and rotated relative to barrel 11, preferably while barrel 11 is at room temperature. The preferred embodiment of tool 20 for forming backout stop 15 includes a shank 21 and a generally cup-shaped body 22 having a socket 23 that snuggly fits around outer surface 17 of the cylindrical wall of barrel 11. Rear end 12 of barrel 11 seats firmly against the bottom 24 of socket 23 when the tool and barrel are fully engaged for forming backout stop 15.

Figure 4:
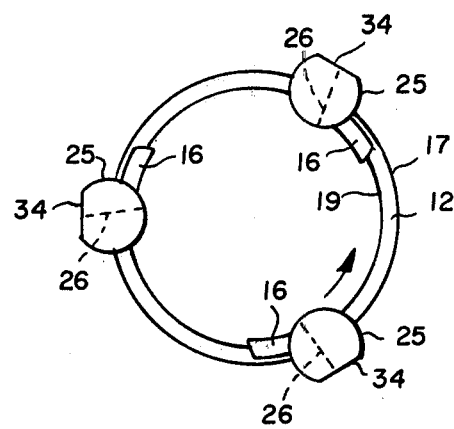
FIG. 4 is a partially schematic, rear end elevational view of a caulker barrel being formed with a rear end stop according to the invention.

An element 25 having a resin-forming edge 26 is secured in a bore hole 27 in tool body 22 by set screws 28 in a position so that edge 26 protrudes obliquely into socket 23 to extend along inclined surface 16 of stop 15 when tool 20 and barrel 11 are fully engaged. Several elements 25 are preferred over a single element so that several edges 26 can form respective segments of a backout stop as best shown in FIG. 4, and three or four elements 25 are probably better choices than either more or less. The segments formed by each edge 26 can join to form a single 360 degree stop, or edges 26 can rotate through short enough arcs so the segments are spaced apart as shown in FIG. 4.

Figure 5:
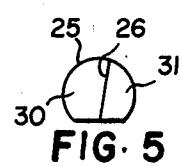
FIGS. 5–7 are respective top, front, and side views of a resin-forming edge element that is preferred for the inventive apparatus.
Figure 6:
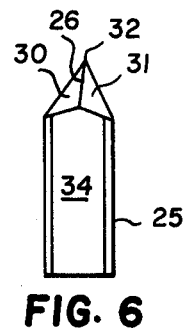
Figure 7:
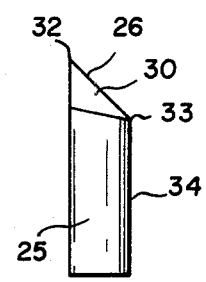

An easy way to make elements 25 is by grinding a cylindrical rod to the shape shown in FIGS. 5-7. A pair of sloping surfaces 30 and 31 join at a peak forming edge 26, which is inclined to have a radially inward high point 32 and a radially outward low point 33 next to the side of element 25 where a flat surface 34 is ground to receive set screws 28.

Figure 3:
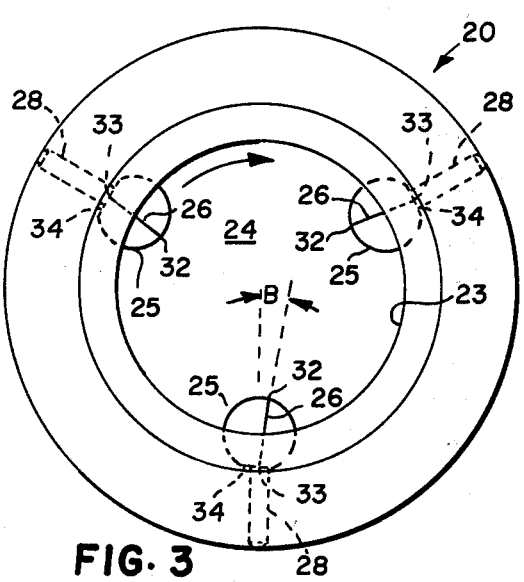
FIG. 3 is a plan view of the apparatus of FIG. 2.

As best shown in FIGS. 3 and 5, edge 26 is angled a few degrees from a perpendicular to flat surface 34 so as to be angularly offset from a radius of the tool 20 by the angle B as shown in FIG. 3. Angle B is known to work well at about 10 degrees, and might work at larger or smaller angles. The inclination of edge 26 off the radius of tool 20 by the angle B makes the radially outer portions of edge 26 precede the radially inner portions of edge 26 in moving through the resin material at the rear end 12 of caulker barrel 11 when tool 20 turns in the direction of the arrow in FIG. 3. This makes edge 26 plow through the resin and slide the resin material radially inward along edge 26 as it works around the perimeter of rear end 12 for forming stop hook 15 smoothly and neatly in the desired triangular shape with an inclined surface 16 and an abrupt edge 18.

Figure 2:
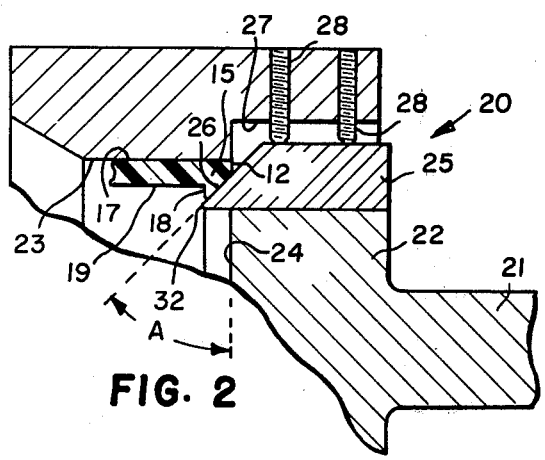
FIG. 2 is an enlarged cross-sectional view of a preferred embodiment of the inventive apparatus engaging the rear end of a caulker barrel on which a backout stop is formed according to the invention.

The oblique orientation of resin forming edge 26 sloping radially inward along inclined surface 16 of stop 15 as best shown by angle A of FIG. 2 is preferably about 35 degrees from a plane perpendicular to the barrel and tool axis, but larger or smaller angles may also work well. The inner end or point 32 of edge 26 preferably extends radially inward beyond the innermost edge of the triangular cross-sectional shape of stop 15 as best shown in FIG. 2, and the outer end 33 of edge 26 preferably extends radially outward beyond outer surface 17 of barrel 11 and axially beyond rear end 12. This makes resin-forming edge 26 extend linearly beyond both ends of inclined surface 16 of backout stop 15 for smoothly forming surface 16 as tool 20 rotates relative to barrel 11. Edge 26 also preferably extends close to outer surface 17 of barrel wall 11 so as to cut obliquely across rear end 12 and plow resin material radially inward as edge 26 works rotationally around rear end 12.

When tool 20 and barrel 11 are first pressed into axial seated engagement with each other, edges 26 cut obliquely into rear end 12. Then as tool 20 rotates relative to barrel 11, each of the edges 26 plows circumferentially along rear end 12 and forces resin material radially inward. This plows the rear end 12 of barrel 11 into the triangular shaped hook stop 15 that is best shown in FIGS. 2 and 4. Rotation preferably occurs only when tool 20 and barrel 11 are fully seated and pressed together with rear end 12 engaging the bottom 24 of socket 23. Either barrel 11 or tool 20 can be rotated and moved axially to bring the work piece and tool into proper engagement and rotation to make stop segments of the desired length and spacing. With n as the number of edges 26, rotation of n/360 degrees forms a full circle stop hook, and rotation of less than n/360 degrees forms spaced segments of a stop hook as shown in FIG. 4.

Figure 8:
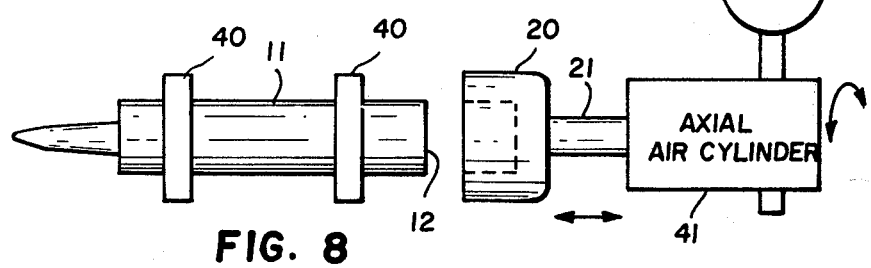
FIG. 8 is a partially schematic, side elevational view of a work station for practicing the invention.

A preferred way to accomplish the overall operation is best shown schematically in FIG. 8 where barrel 11 is held in axial alignment with tool 20 by clamps 40. An air cylinder 41 axially moves tool 20 against the rear end 12 of barrel 11 and another air cylinder 42 engages and rotates air cylinder 41 to turn tool 20 relative to barrel 11. Of course, other prime movers and motion arrangements are also possible.

The inventive way of forming backout stop 15 evolved through several unsuccessful experiments. These included attempts to deform rear end 12 into a backout stop by using a continuous flat tool pressed against rear end 12, dowel pins and rollers moved at an incline around the inner edge of rear end 12, and dowels pressed against and moved around rear end 12 at an orientation perpendicular to the barrel axis. Rounded and flat surfaces forced against rear end 12 produced failures at any orientation.

Cutting edges 26 oriented to plow through resin material in forming hook-shaped stop 15 significantly improve over previous attempts and for a stop that is neat, clean, and uniformly and reliably shaped. They also operate well on resin material at room temperature and avoid the problems of oxidation and resin buildup on tools that result when higher temperatures are used. Moreover, edges 26 operate quickly with relatively little pressure so that tooling is inexpensive and parts are not damaged. Edges 26 also wear well and are sharpenable and adjustable. The process can proceed at a high speed with very little cost per caulker and also produce stops that look good and work well.

We claim:

1. A method for making a backout stop for a caulker cartridge having a cylindrical barrel of resin material, said backout stop being formed at the rear end of said barrel as a radially inwardly oriented hook that is generally triangular in cross section with an inclined surface sloping radially inward from the region of the outer surface of said barrel for allowing a plunger to be moved over said backout stop into said rear end of said barrel, said hook also having an abrupt edge extending inward from the inside surface of said barrel and preventing said plunger from moving rearwardly out of said rear end of said barrel, said method using a tool having a socket fitting over said rear end of said barrel and a resin-forming edge protruding obliquely into said socket to extend along said inclined surface when said tool is seated on said rear end of said barrel, and said method comprising:

a. supporting said barrel and said tool on a common axis with said socket of said tool confronting said rear end of said barrel;

b. moving one or the other of said barrel and said tool axially to press said tool and said rear end of said barrel together in seated engagement wherein said edge is pressed into said resin material at said rear end of said barrel;

c. rotating one or the other of said barrel and said tool while said tool and said barrel are pressed together so said edge plows along said inclined surface and forms said resin material at said rear end of said barrel into said hook; and d. axially separating said tool and said rear end of said barrel.

2. The method of claim 1 wherein said rotating is less than 360 degrees.

3. The method of claim 1 including using a plurality of said edges.

4. The method of claim 3 wherein said rotating is less than n/360 degrees, where n is the number of said edges, to form said backout stop as a plurality of segments around said rear end of said barrel.

5. Apparatus for making a backout stop for a caulker cartridge having a cylindrical barrel of resin material, said backout stop being formed at the rear end of said barrel as a radially inwardly oriented hook that is generally triangular in cross section with an inclined surface sloping radially inward from the region of the outer surface of said barrel for allowing a plunger to be moved over said backout stop into said rear end of said barrel, an abrupt edge extending inward from the inside surface of said barrel and preventing said plunger from moving rearwardly out of said rear end of said barrel, and said apparatus comprising:
 a. a tool having a socket shaped for fitting over said rear end of said barrel;
 b. a resin-forming edge protruding obliquely into said socket so that when said tool and said rear end of said barrel are in seated engagement said edge extends along said inclined surface of said hook;
 c. means for supporting said barrel and said tool on a common axis with said socket of said tool confronting said rear end of said barrel;
 d. means for moving one or the other of said barrel and said tool axially to press said tool and said rear end of said barrel together in seated engagement wherein said edge is pressed into said resin material at said rear end of said barrel;
 e. means for rotating one or the other of said barrel and said tool while said tool and said barrel are pressed together said edge plows along said inclined surface and forms said resin material of said barrel into said hook; and
 f. means for axially separating said tool and said rear end of said barrel.

6. The apparatus of claim 5 wherein said rotating is less than 360 degrees.

7. The apparatus of claim 5 including a plurality of said edges.

8. The apparatus of claim 7 wherein said rotating is less than n/360 degrees, where n is the number of said edges, to form said backout stop as a plurality of segments around said rear end of said barrel.

9. The apparatus of claim 7 wherein said edge is inclined so that radially outer portions of said edge precede radially inner portions of said edge in plowing through said resin material of said barrel.

10. The apparatus of claim 7, wherein said rotating is less than 360 degrees.

11. The apparatus of claim 7, including a plurality of said edges, and wherein said rotating is less than n/360 degrees, where n is the number of said edges, to form said backout stop as a plurality of segments around said rear end of said barrel.

* * * * *

UNITED STATES PATENT OFFICE
CERTIFICATE OF CORRECTION

Patent No. 4,217,687          Dated 19 August 1980

Inventor(s) Phillip L. Miller and Dick T. vanManen

It is certified that error appears in the above-identified patent and that said Letters Patent are hereby corrected as shown below:

Change "n/360" to --360/n-- for each occurrence at Column 3, line 68; Column 4, line 1; Column 5, line 6; and Column 6, lines 16 and 26.

Signed and Sealed this

Thirty-first Day of March 1981

[SEAL]

Attest:

RENE D. TEGTMEYER

Attesting Officer     Acting Commissioner of Patents and Trademarks